United States Patent [19]

Fournier

[11] 4,348,782
[45] Sep. 14, 1982

[54] WINDSCREEN WIPER COMPRISING AN ARM WITH AN ATTACHED END FITTING, IN PARTICULAR FOR MOTOR VEHICLES

[75] Inventor: Gérard R. Fournier, Chelles, France

[73] Assignee: Equipements Automobiles Marchal, Issy-les-Moulineaux, France

[21] Appl. No.: 280,202

[22] Filed: Jul. 6, 1981

[30] Foreign Application Priority Data

Jul. 7, 1980 [FR] France ................................. 80 15081

[51] Int. Cl.³ .............................................. B60S 1/40
[52] U.S. Cl. .................................................. 15/250.32
[58] Field of Search ......................... 15/250.32–250.42

[56] References Cited

U.S. PATENT DOCUMENTS 3,576,044  4/1971  Besnard ............................. 15/250.32
4,142,268  3/1979  Brown et al. ...................... 15/250.32

FOREIGN PATENT DOCUMENTS 2743086  3/1978  Fed. Rep. of Germany ... 15/250.32
2119830  8/1972  France .............................. 15/250.32

*Primary Examiner*—Peter Feldman
*Attorney, Agent, or Firm*—Brisebois & Kruger

[57] ABSTRACT

The invention provides a wiper arm end fitting for a vehicle windscreen wiper, formed of two moulded plastic halves which each include a recess portion to define a recess to receive and hold the end of a wiper arm, and also define an articulation connection with a wiper blade mounting. The wiper blade mounting is of channel section and serves to hold the two halves of the wiper arm end fitting in mutual engagement on the end of the wiper arm. Preferably the two halves of the wiper arm end fitting are interconnected by a film hinge.

15 Claims, 3 Drawing Figures

WINDSCREEN WIPER COMPRISING AN ARM WITH AN ATTACHED END FITTING, IN PARTICULAR FOR MOTOR VEHICLES

BACKGROUND OF THE INVENTION

The present invention relates to a windscreen wiper, for example for a motor vehicle, formed by a windscreen wiper arm associated with a windscreen wiper blade fitting, the articulation being effected by means of an end fitting attached to the wiper arm.

It is known that a windscreen wiper blade fitting is carried along on the surface to be swept by a windscreen wiper arm which is generally given a reciprocating motion thanks to a driving device. A cylindrical articulation is arranged between the windscreen wiper blade fitting and the windscreen wiper arm, to allow motion of the wiper blade fitting in relation to the arm in the course of the wiping action. There exist various types of windscreen wiper arms, each type cooperating with a particular type of a windscreen wiper blade fitting. In use of a vehicle fitted with such a windscreen wiper, the windscreen wiper arm sustains practically no wear whereas, on the contrary, the windscreen wiper blade fitting must be changed from time to time if a satisfactory wiping of the windscreen is to be permanently ensured. For a given windscreen wiper arm, it would therefore be theoretically necessary to have a corresponding windscreen wiper blade fitting of a given type. Now it is desirable to have the facility of fitting various types of windscreen wiper blade fittings on an arm so as to facilitate exchange of the windscreen wiper blade fitting. It is therefore desirable to provide, as well as replacement windscreen wiper blade fittings, wiper arm end fittings made of a plastic material which cooperate with the type of windscreen wiper blade fitting with which they are sold and which are capable of being fitted on such various types of windscreen wiper arms as are normally intended for a different type of wiper blade fitting.

THE PRIOR ART

It has already been proposed, for instance in the French Patent 2119 830, to make an articulated end fitting of two interconnected parts which is interposed between a windscreen wiper arm and its associated blade fitting. However this device has the drawback of involving interfixing of two components of the end fitting, by means of screws, and this is not convenient for the user. Moreover, the wiper arm end fitting comprises a pivot pin bearing formed by two coaxial cylindrical openings and this requires the user to position the pivot pin himself to effect the interconnection between the wiper arm end fitting and the windscreen wiper blade fitting; thus the number of components to be assembled is greatly increased when a new wiper blade fitting is fitted. Moreover, this device occupies too great a height.

BRIEF SUMMARY OF THE INVENTION

It is an object of the present invention to provide a windscreen wiper comprising a wiper arm end fitting made of a plastic material, moulded in two parts, which is easily positioned at the end of the wiper arm to allow it to be associated with a windscreen wiper blade fitting which carries a pivot pin between two substantially parallel side flanges. In relation to the prior art wiper, it will be seen that a first advantage, as far as the user of the inventive wiper is concerned, lies in the fact that when the windscreen wiper blade fitting is replaced, it is not necessary in view of the proposed wiper arm end fitting, to position the pivot pin, since the pivot pin can be a permanent part of the windscreen wiper blade fitting itself. Moreover, in the windscreen wiper according to the invention, the wiper arm end fitting is placed into position around the wiper arm end without any need for the user to screw the two components of the end fitting to each other. There is therefore here another simplification when the new windscreen wiper blade fitting is installed on the wiper arm. To ensure the positioning of the pivot pin in the wiper arm end fitting, provision is made in the known way, for the bearing accommodating the pin to communicate with the outside via a slot allowing the pivot pin to be introduced into the bearing. According to the invention, the two side flanges supporting the pivot pin carried by the windscreen wiper blade fitting themselves maintain the two components of the wiper arm end fitting at the end of the arm between themselves, after assembly. The wiper arm end fitting must, of course, be fixed on the arm end in a satsifactory way: for this purpose, it is formed according to the invention, by two components each defining a part of the recess wherein the arm is to be positioned; the assembly of the two components of the wiper arm end fitting may involve a catch engagement or snap-fit action.

Moreover, according to the invention, the two components of the wiper arm end fitting may be interconnected by a film hinge which, on the one hand, make is possible to form them simultaneously in a single moulding operation and to interconnect them in order to reduce the number of components to be assembled when the windscreen wiper blade fitting is mounted on the wiper arm and which, on the other hand, makes it possible to prevent any relative separation of the two components of the wiper arm end fitting in use of the windscreen wiper so that there will be no relative motion between the wiper arm and the wiper arm end fitting in spite of the transverse stresses arising during use.

The present invention therefore provides a new industrial product constituted by a windscreen wiper, for example, for motor vehicles, formed by: a windscreen wiper arm associated with a windscreen wiper blade fitting; an articulated wiper arm end fitting made of a plastic material and carried by the end of the arm and cooperating with the two substantially parallel side flanges of the said blade fitting, the wiper arm end fitting being made of two components which define, when assembled, a housing whose shape corresponds to that wiper arm end which carries the wiper arm end fitting and which is positioned therein. The inventive windscreen wiper is characterised in that the thickness of the wiper arm end fitting measured, perpendicularly to side surfaces of the said wiper arm end fitting, is substantially equal to the distance separating the two side flanges of the blade fitting so that the components of the wiper arm end fitting can be locked by the said side flanges, after having been inserted therebetween.

In a preferred embodiment, the windscreen wiper blade fitting comprises a blade mounting constituted by a channel with a U-shaped cross section whose sides carry a pivot pin and whose web has a cut out extending on either side of the zone situated adjacent the pivot pin; the two components of the wiper arm end fitting are interconnected to each other by a film hinge; the film hinge is disposed in the plane of assembly of the two components over a zone of the rectilinear edge arranged between a pivot pin-receiving slot and the windscreen wiper arm to the side of the axis of the pin-receiving bearing away from the blade fitting; the film hinge is disposed substantially near the centre line of the end of the wiper arm which is connected to the wiper arm end fitting; the two components of the wiper arm end fitting are assembled around the wiper arm with a catch engagement of at least one catch engagement stud in a respective hole and/or with the centering of at least one centering stud in an appropriate opening; the two components of the wiper arm end fitting are substantially symmetrical to each other in relation to a plane, and each carry a half bearing which communicates with the outside via a slot portion extending in the direction away from the wiper arm, substantially parallel to the centre line of the said arm near its end which carries the wiper arm end fitting; the end of the wiper arm which is arranged in the recess of the end fitting, comprises engagement means which cooperate with the moulded zones of the two half recesses in each of the two components of the wiper arm end fitting; the arm end which is arranged in the recess of the end fitting has a U-shaped cross section; the two sides of the U section which constitute the end of the wiper arm engaged in the end fitting each have at least one cutout receiving a boss projecting in the half recess provided for the arm in each one of the two components of the wiper arm end fitting; the slot which communicates each half bearing with the outside on the end away from the wiper arm has, at least in the zone near the half bearing, a width which is less or equal to the diameter of the said half bearing measured perpendicularly to the plane which is parallel to the wiper arm and to the bearing axis; the slot has a width measured perpendicularly to the said plane which is parallel with the arm and the bearing axis which is substantially constant over the whole length of the said slot; the wiper arm end fitting comprises, in its zone which is opposite the slot, a cylindrical bearing surface which is coaxial with the axis of said bearing and which cooperates with a friction action with one of the transverse edges of the cutout of the blade mounting; the wiper arm end fitting comprises, at its end remote from the slot, a catch which limits the angular deflection and which cooperates with one of the transverse edges of the cutout of the blade mounting; the wiper arm end fitting comprises at least one locking catch which cooperates with one of the transverse edges of the cutout of the web of the blade mounting, the articulation being effected at the level of at least one boss obtained integrally moulded with one of the two components of the wiper arm end fitting.

DESCRIPTION OF THE DRAWINGS

In order that the present invention may more readily be understood there will now be described two embodiments, shown in the attached drawings, by way of a purely illustrative and non-restrictive example.

In these drawings.

DESCRIPTION OF THE PREFERRED EMBODIMENT

Figure 1:
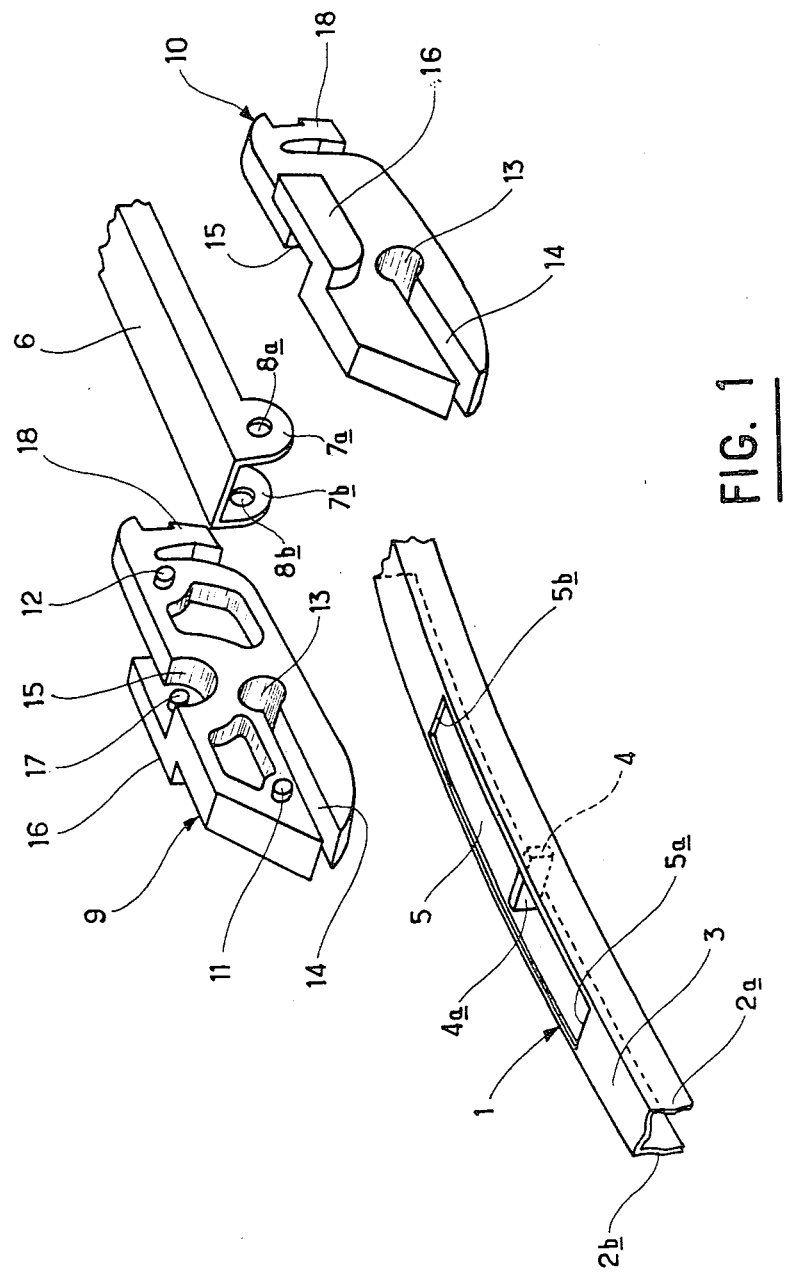
FIG. 1 shows, as an exploded perspective view, the arm, the blade fitting and the arm end fitting of a windscreen wiper according to the invention, the two symmetrical parts of the arm end fitting being represented separately on either side of the arm.
Figure 2:
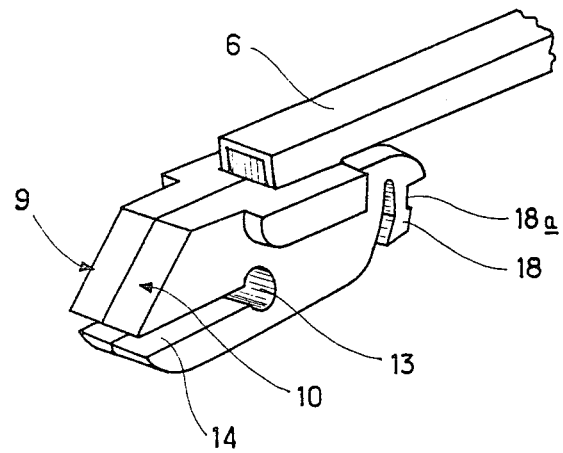
FIG. 2 shows, in perspective, the windscreen wiper arm of FIG. 1 equipped with its end fitting comprising the two components assembled together.

Referring now to FIGS. 1 and 2, there will be seen the windscreen wiper blade fitting 1 which is intended to be fitted to the end 6 of a windscreen wiper arm. FIG. 1 shows only a part of the windscreen wiper blade fitting 1, more precisely the central part of the metal mounting channel which supports the rubber wiper blade of the windscreen wiper blade fitting. The metal mounting channel of blade fitting 1 has a U-shaped cross section with the two side flanges 2a, 2b of the channel parallel and interconnected by a web 3. In the central zone of the mounting channel of blade fitting 1, there has been positioned a pivot pin 4 which is carried by the two sides 2a, 2b. The pin 4 is a generally cylindrical pin having two diametrically opposed flats 4a, and is perpendicular to the side flanges 2a, 2b. In register with the pin 4, the web 3 comprises a cutout 5 which is bounded by two transverse edges 5a, 5b.

The windscreen wiper arm is formed at its end 6 which is intended to be connected to the windscreen wiper blade fitting 1, by a profile strip having a channel cross section; the side flanges 7a, 7b of this strip terminate in lugs having in their central zone coaxial openings 8a, 8b respectively. A central longitudinal plane parallel to the planes of the side flanges 7a, 7b defines the plane of symmetry of the windscreen wiper arm.

The end fitting which is to be fitted on the end 6 of the windscreen wiper arm is formed by two symmetrical moulded plastic parts 9 and 10. These parts 9 and 10 are symmetrical in relation to their plane of contact which they exhibit in the assembled configuration, referred to herein as the "plane of assembly" except as regards catch engagement studs 11 and 12 which have been provided on one component 9 and which cooperate with corresponding catch engagement openings provided on the other component 10 (and which are not visible in FIG. 1). Each of the components 9 and 10 comprises a cylindrical half bearing recess 13, communicating with the outside via a longitudinal slot 14 which is substantially parallel to the web of the windscreen wiper arm strip and is disposed in relation to the bearing recess 13 at the side remote from the arm end 6. Along its top edge, each of the components 9 and 10 comprises a half bearing recess 15 which is intended to accommodate the lugs 7a, 7b and the corresponding side flanges of the windscreen wiper arm end 6. Each half bearing recess 15 is upwardly open, that is to say, open on the side of the recess 15 remote from the bearing recess 13; it is also open at the end nearer the plane of assembly of the two components 9 and 10 of the end fitting. The recess 15 is bounded on the outer end by a wall 16 of which there are in all two with each one projecting on either side of the end fitting 9, 10. The wall 16 comprises a centering stud 17 projecting into the half-bearing recess 15 and which is intended to penetrate into one of the holes 8a, 8b of the lugs at the end of the windscreen wiper arm, in the assembled configuration of the arm and end fitting.

To assemble the two components 9 and 10 of the end fitting on the end 6 of the windscreen wiper arm, the two components 9 and 10 are brought together so that the lugs 7a, 7b come into the two half-bearing recesses 15, the studs 17 engaging in the holes 8a, 8b. When this bringing together has been completed, the two components 9 and 10 are pressed against each other to produce catch engagement of the studs 11 and 12 in their associated holes (not shown), and the end 6 of the arm has then been integrated with the two components 9 and 10 which constitute the end fitting. The separation of the two parallel edges of longitudinal slot 14 is equal to the spacing between the two flats 4a of the pin 4, and it is therefore sufficient to insert the pin 4 into the slot 14, by sliding the two flats 4a along the sides of the slot 14 until the pin 4 arrives in its bearing recess 13 and the blade fitting 1 can then be rotated relative to the end fitting 9, 10 to produce their interlocking in relation to each other (since the diameters of the pin 4 and of its bearing recess 13 are greater than the width of slot 14; they may of course be substantially equal). In their operative position, the flats 4a are approximately perpendicular to the plane sides delimiting the slot 14 as well as to the web of the arm end 6. It will therefore be seen that the two components 9 and 10 of the end fitting are held gripped between the side flanges 2a, 2b of the windscreen wiper blade fitting 1 and, since the thickness of the end fitting 9, 10 measured parallel to the axis of the bearing recess 13 is substantially equal to the distance between side flanges 2a and 2b, it is then impossible to separate the two components 9 and 10 which are additionally held locked around the arm end 6 by the side flanges 2a, 2b of the windscreen wiper blade fitting. This locking, additional to the catch engagement due to the studs 11 and 12, is necessary in view of the fact that during operation the windscreen wiper sustains transverse stresses at the level of its articulation which tend to separate the components 9, 10 and, in these circumstances, the assembly of the two components 9 and 10 solely by catch engagement studs would not be sufficient to ensure that the relative position of the two components 9 and 10 is maintained.

In its zone which is to the side of the bearing recess 13 remote from the slot 14, the end fitting 9, 10 comprises a catch 18 which comes to cooperate with the transverse edge 5b of the cutout 5 of the windscreen wiper blade fitting 1. This catch 18 limits the angular deflection of the blade fitting 1, in relation to the arm end 6 and thus prevents any risk of disengagement of the blade fitting, thereby ensuring the permanent interfixing of the two components 9 and 10 of the end fitting.

In a variant which has not been shown, the slot 14 would have a width equal to the diameter of the bearing recess 13, in which case the maintenance of the blade fitting 1 in position relative to the windscreen wiper arm end fitting 9, 10 would be ensured by the cooperation of the transverse edge 5b with the cylindrical bearing surface 18a (FIG. 2) which interconnects the catch 18 and the zones of the components 9 and 10 which delimit the half bearing recesses 15.

Figure 3:
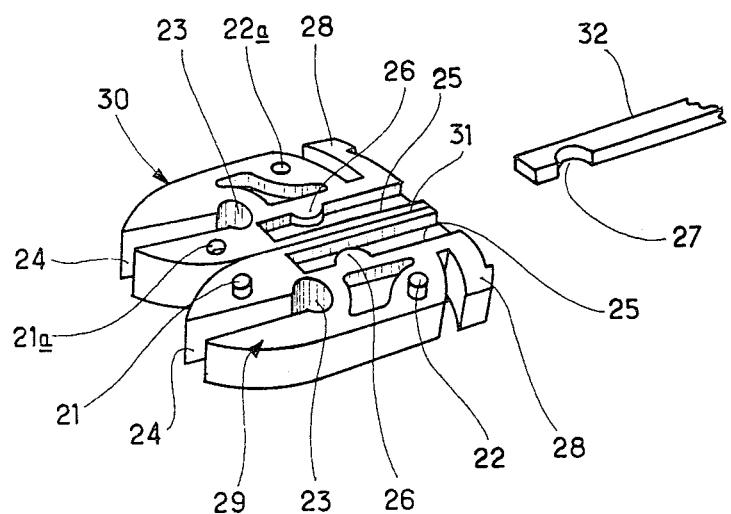
FIG. 3 shows, in perspective, a variant of the arm end fitting of a windscreen wiper according to the invention, the two components of the arm end fitting being interconnected by a film hinge and being illustrated in the "opened" position adjacent the end of the windscreen wiper arm which is to cooperate with the end fitting, the corresponding windscreen wiper blade fitting being identical to that shown in FIG. 1.

Referring now to FIG. 3, there will be seen a variant in which the end fitting of the windscreen wiper according to the invention is formed by two integrally moulded plastic components 29 and 30 interconnected by a rectilinear film hinge 31. The film hinge 31 is located in the plane of assembly of the two components 29 and 30, along a line which is disposed near the centre line of the windscreen wiper arm 32 on which the end fitting 29, 30 is to be fitted. The film hinge 31 is substantially parallel to the centre line of the arm 32. Each of components 29 and 30 comprises an elongate half recess 25 partially interrupted by a moulded protrusion 26 which cooperates with a corresponding engagement means 27 of arm 32. Each part 29, 30 comprises a cylindrical bearing recess 23 opening towards the outside, via a slot 24 connected to the zone of the recess 23 which is diametrically opposite to the zone adjacent the half recess 25. The component 29 comprises two catch engagement studs 21, 22 which cooperate with the cooresponding holes 21a, 22a in the other component 30. At its end opposite to that where the slot 24 opens out, each component 29 and 30 comprises a catch 28 for limiting the angular deflection of the blade fitting 1 relative to the arm 32.

The positioning of the end fitting 29, 30 on the end of the windscreen wiper arm 32 is effected by disposing the arm end in one of the half-recesses 25 and then closing the bipartite fitting 29, 30 around the arm end by pivoting one of the components 29 or 30 around the film hinge 31 relative to the other component 30 or 29, respectively. When this pivoting has been effected, the assembly is completed by the catch engagement of the studs 21 and 22 in their associated holes 21a, 22a. The end fitting has thus been mounted on the end of the arm 32 and it is then sufficient to position the pin 4 of the windscreen wiper blade fitting 1 in its recess 23 in the same way as has been indicated above for the first variant where the positioning of the pin 4 in its recess 13 has been described. Here again, the two side flanges of the windscreen wiper blade fitting 1 thus placed into position maintain the two components 29 and 30 of the arm end fitting against each other, but additionally the hinge 31 ensures an interconnection between the two components 29 and 30, this interconnection being located precisely in the zone which sustains the greatest separation stresses by reason of the transverse stresses in the course of the operation of the windscreen wiper.

It shall be duly understood that the embodiments described above are in no way restrictive and may give rise to any desirable modifications without thereby departing from the scope of the invention as defined by the following claims.

I claim:

1. In a windscreen wiper comprising a windscreen wiper arm; a windscreen wiper blade fitting carried by said arm, and having two substantially parallel side flanges; an articulated wiper arm end fitting made of a plastic material and carried by the end of the arm, and itself pivotally supporting the wiper blade fitting, said wiper arm end fitting having first and second side surfaces and cooperating with said two substantially parallel side flanges of the said blade fitting, said plastic wiper arm end fitting comprising first and second components, said components including means defining, in assembled configuration of the wiper arm end fitting components, a recess whose shape corresponds to that of said wiper arm which carries the end fitting and which is positioned in said recess; the improvement wherein the thickness of the wiper arm end fitting, measured perpendicularly to said first and second side surfaces of the wiper arm end fitting, is substantially equal to the distance separating said two side flanges of the blade fitting whereby said first and second components of the end fitting may be locked together by the said side flanges after having been inserted therebetween.

2. A windscreen wiper according to claim 1, wherein the windscreen wiper blade fitting comprises a wiper blade mounting formed by a channel with a U-shaped cross section whose side flanges carry a pivot pin and whose web includes means defining a cutout extending to either side of the zone in register with the said pivot pin.

3. A windscreen wiper according to claim 1, including a film hinge interconnecting said first and second components of the wiper arm end fitting, said first and second components having been integrally moulded.

4. A windscreen wiper according to claim 3 wherein said first and second components of the wiper arm end fitting are substantially symmetrical with regard to each other in relation to a plane, and each includes means defining a half bearing which, in the assembled condition complements the half bearing of the other component to define a bearing in which the blade end fitting is positioned, and wherein said first and second components furthermore include means which, in said assembled condition define a slot extending from the bearing in the direction away from said wiper arm substantially parallel to the centre line of the said arm near its end which carries the wiper arm end fitting, said slot opening to the exterior of said wiper arm end fitting.

5. A windscreen wiper according to claim 4, wherein said first and second components of the wiper arm end fitting includes means defining a slot in the assembled wiper arm end fitting to guide the wiper blade fitting into said bearing and wherein the film hinge is disposed in the plane of assembly of the first and second components over a rectilinear perimetral zone of each said first and second component arranged between said slot and said windscreen wiper arm and to the side of the axis of the bearing opposite to the side at which the wiper blade fitting is located.

6. A windscreen wiper according to claim 5, wherein the film hinge is disposed substantially near the centre line of the end of said wiper arm on which the wiper arm end fitting is carried.

7. A windscreen wiper according to claim 4, wherein the slot which causes each said half bearing to communicate with the outside of the wiper arm end fitting at the end where the arm is not located has, at least near the half bearing a width, measured perpendicularly to the plane which is parallel to the wiper arm and to the axis of the bearing, which is less than or equal to the diameter of the said half bearing.

8. A windscreen wiper according to claim 7, wherein the slot has a width, measured perpendicularly to said plane which is parallel to the arm and to the axis of said bearing which is substantially constant along the whole length of the said slot.

9. A windscreen wiper according to any one of claims 4 to 8, wherein the windscreen wiper blade fitting comprises a wiper blade mounting formed by a channel with a U-shaped cross section whose side flanges carry a pivot pin and whose web includes means defining a cutout extending to either side of the zone in register with the said pivot pin and wherein the wiper arm end fitting comprises, at its end opposite to the slot, a cylindrical bearing surface which is coaxial with the axis of the first mentioned bearing, and which cooperates with a friction action with one of the transverse edges of said cutout of the web of the channel of the wiper blade mounting.

10. A windscreen wiper according to any one of claims 4 to 8, wherein the windscreen wiper blade fitting comprises a wiper blade mounting formed by a channel with a U-shaped cross section whose side flanges carry a pivot pin and whose web includes means defining a cutout extending to either side of the zone in register with the said pivot pin and wherein the wiper arm end fitting comprises in its zone opposite to the slot, a catch for limiting the angular deflection of the wiper blade mounting relative to the wiper arm end fitting, said catch cooperating with one of the transverse edges of the cutout of web of the wiper blade mounting channel.

11. A windscreen wiper according to any one of claims 4 to 8, wherein the windscreen wiper blade fitting comprises a wiper blade mounting formed by a channel with a U-shaped cross section whose side flanges carry a pivot pin and whose web includes means defining a cutout extending to either side of the zone in register with the said pivot pin and wherein the wiper arm end fitting comprises at least one locking catch which cooperates with one of the transverse edges of the cutout of web of the mounting, and at least one boss moulded on one of said first and second components of the wiper arm end fitting for serving as articulation pin to achieve articulation of said wiper blade mounting to said wiper arm end fitting.

12. A windscreen wiper according to any one of claims 1 to 8, wherein said first and second components of the wiper arm end fitting include co-operating catch engagement studs and holes and centering studs, wherein said wiper arm includes openings to receive said centering studs, and wherein the first and second components of the wiper arm end fitting are assembled around the wiper arm by catch engagement of at least one said catch engagement stud with an associated one of said catch engagement holes and by engagement of at least one of said centering studs in an appropriate arm opening.

13. A windscreen wiper according to any one of claims 1 to 8, wherein said means of each of said first and second components defining said recess in the assembled wiper arm end fitting comprise means defining a half of said recess to complement the corresponding means of the other component in the assembled condition; and wherein the end of the wiper arm which is arranged in the recess of the wiper arm end fitting comprises engagement means which cooperate with the two half recesses to hold said wiper arm end fitting in place on said wiper arm.

14. A windscreen wiper according to any one of claims 1 to 8, wherein the end of the wiper arm which is received in said recess of the wiper arm end fitting is a channel of U-shaped cross section.

15. A windscreen wiper according to claim 13, wherein the end of the wiper arm which is received in said recess of the wiper arm end fitting is a channel of U-shaped cross section and wherein the side flanges of the channel which forms the end of the wiper arm received in the wiper arm end fitting each have at least one cutout receiving a boss projecting in the half recess provided for the wiper arm in each one of said first and second components of the wiper arm end fitting.

* * * * *